United States Patent [15] 3,673,886
Tomita et al. [45] July 4, 1972

[54] BALL NUT SCREW ASSEMBLY

[72] Inventors: Tamaki Tomita, Okazak; Akira Suzuki, Kariya, both of Japan

[73] Assignee: Toyoda Koki Kabushiki Kaisha

[22] Filed: Dec. 14, 1970

[21] Appl. No.: 97,984

[52] U.S. Cl. ................................74/424.8 R, 74/459
[51] Int. Cl. ..............................F16h 1/18, F16h 55/22
[58] Field of Search..............................74/459, 424.8 R

[56] References Cited

UNITED STATES PATENTS 3,009,367  11/1961  Striggow..................................74/459
2,802,373  8/1957  Schottler..................................74/459
3,494,215  2/1970  Fengler..................................74/459 X Primary Examiner—Leonard H. Gerin
Attorney—Blum, Moscovitz, Friedman & Kaplan

[57] ABSTRACT

A ball nut screw assembly comprises a screw, a nut, and a train of balls within a passageway formed by the helical grooves in the screw and nut and embraced by a plurality, up to four engaging profiles perpendicular to the helical lead wherein at least one of said engaging profiles is formed by two complex profile portions to produce a moment for righting the ball to its predetermined rolling locus when the ball deviates (runs off) from the locus.

8 Claims, 6 Drawing Figures

PATENTED JUL 4 1972
3,673,886
SHEET 1 OF 2
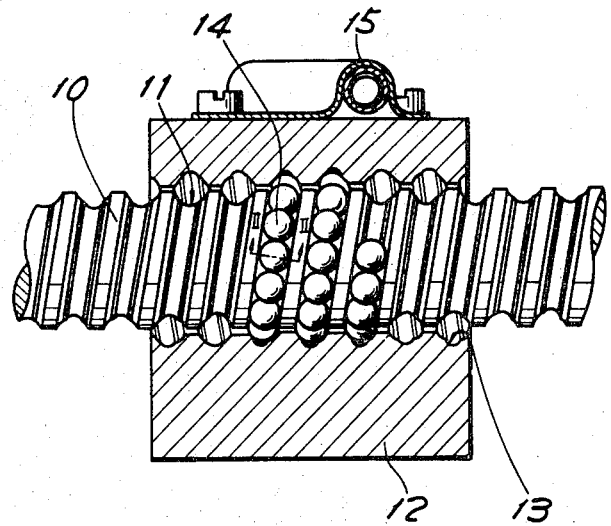
Fig. 1
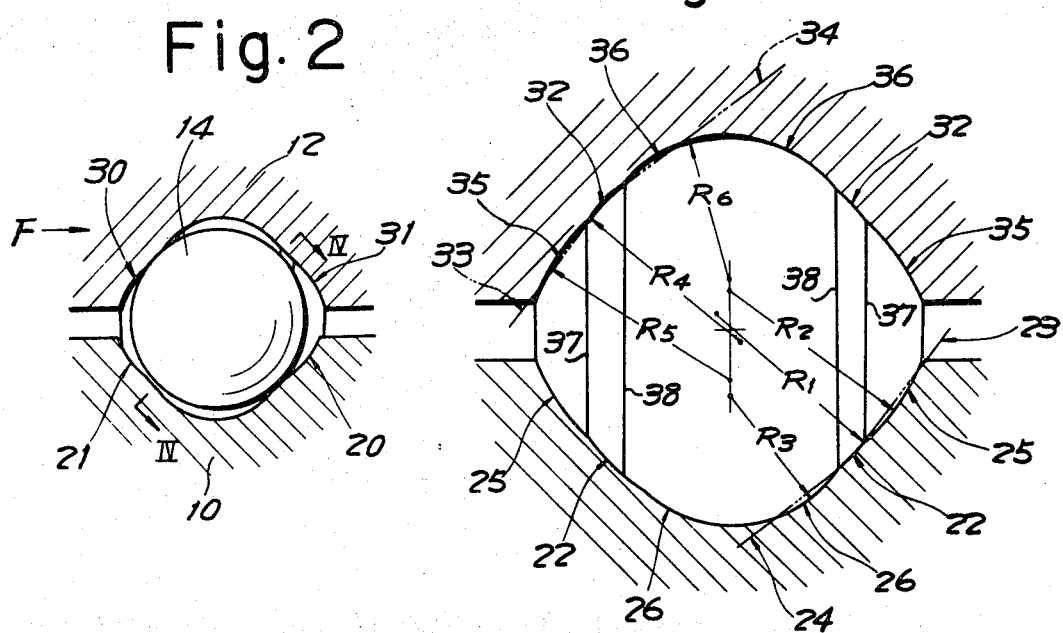
Fig. 2
Fig. 3

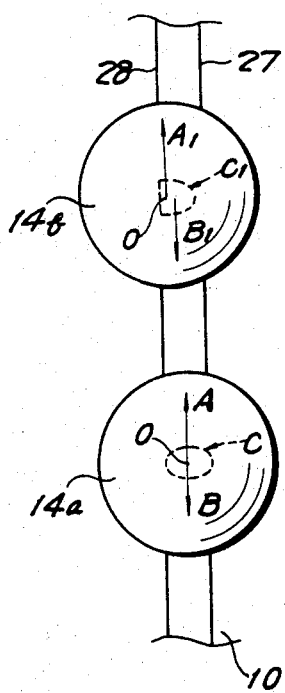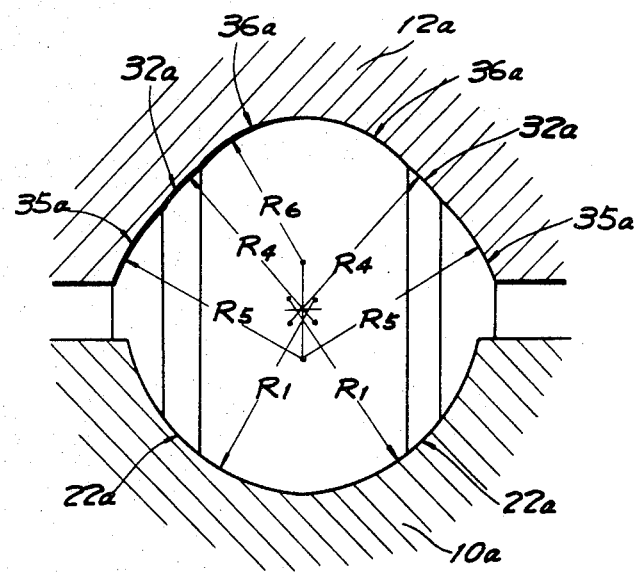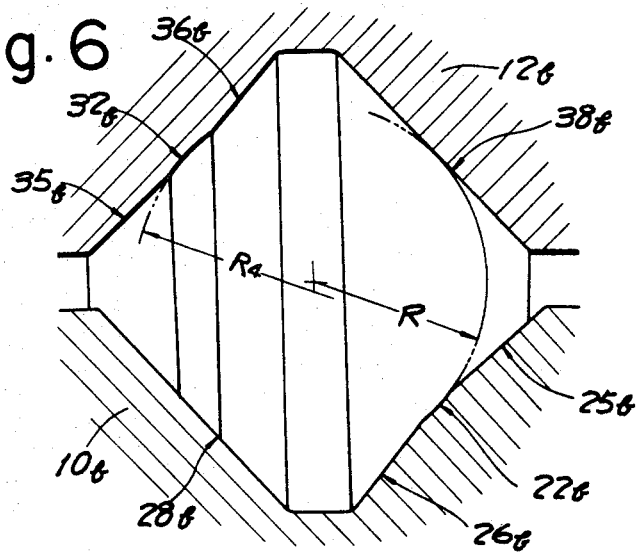

BALL NUT SCREW ASSEMBLY

BACKGROUND OF THE INVENTION

The present invention relates to ball screw and nut devices of the type wherein the screw and nut are helically grooved and are interengaged by a train of balls occupying the grooves.

The devices of this type are applied to feed mechanisms of machine tool and to various types of actuators including power steering.

A conventional screw and nut device generally has a characteristic of self-position maintenance since its statical friction angle is larger than its lead angle, while the ball screw and nut device does not have any characteristics of the self-position maintenance by its very nature since its friction angle is tiny. Therefore, the ball screw and nut device is widely applied to feed screw devices and the like, since the driving torque for the screw is considerably reduced in such a conventional use so that the nut is axially moved by the rotation of the screw. The bearing ball, however, has a tendency to run off (deviate) from a predetermined rolling locus in such use that the screw is rotated by the axial movement of the nut.

A conventional profile-curve perpendicular to the lead of the ball screw is formed by a pair of bi-symmetrical arcs, having different centers from each other, sometimes defined as a "gothic arch" formation. In the helical grooves having the profile-curve of the gothic arch formation, once the bearing ball in its movement starts to run off (deviate) from the predetermined rolling locus, the bearing ball tends to move more and more in the direction of deviation (running off) from its predetermined rolling locus since a righting (counter) force does not operate upon the ball. Therefore, when the aforementioned phenomenon of the bearing ball movement occurs in the conventional ball screw and nut device, the engaging point of the bearing ball fluctuates relative to the screw and nut, so that the train of bearing balls confined within the passageway formed by the screw and nut interfere with one another in rolling motion since each of them fluctuates in its own revolution speed. A friction force thereby increases to produce pulsing movements, as recognized in the occurrence of stick slip, in the operation of the ball screw and nut device, for example, the power steering renders an insecurity to drivers and also the life of the ball screw and nut device is shortened.

SUMMARY OF THE INVENTION

It is, therefore, an object of the present invention to provide a ball screw and nut device, a helical groove of which, the profile-curve thereof produces a righting moment so that a bearing ball in its movement may not run (deviate) off from its predetermined rolling locus.

According to the present invention, there is provided a ball nut screw assembly which comprises a screw having a helical groove formed thereon, a nut having a helical internal groove complementary to the screw groove, and a train of balls confined within a passageway formed by the helical grooves in the screw and nut and embraced by four engaging profiles perpendicular to the lead of the helical grooves. Furthermore, at least one of said four engaging profiles is formed by a first profile portion of a concave short arc contacting with the balls and a second profile portion which connects with the first profile portion and recedes from the center of the ball over tangential lines drawn at both ends of the first profile portion.

Since the engaging region according to Hertz's formula is unbalanced relative to the center of the ball by the aforementioned engaging profile when the ball runs off from a predetermined rolling locus, a friction force operates eccentrically upon the ball, thereby to produce a moment for righting the ball to its desired predetermined rolling locus.

DESCRIPTION OF THE DRAWINGS

The foregoing and other objects of the present invention will become fully apparent from the following description of a preferred embodiment of the present invention with reference to the accompanying drawings, in which:

FIG. 1 is a longitudinal sectional view showing a first embodiment of ball screw and nut devices;

FIG. 2 is an enlarged sectional view taken along the line II — II of FIG. 1;

FIG. 3 is an enlarged schematic view without bearing balls, showing a profile taken along the line II — II of FIG. 1;

FIG. 4 is an enlarged schematic view showing the rolling situation of bearing balls, taken along the line IV — IV of FIG. 2;

FIG. 5 is a sectional view showing a second embodiment of the present invention in place of FIG. 3; and FIG. 6 is a sectional view showing a third embodiment in place of FIG. 3.

DESCRIPTION OF A PREFERRED EMBODIMENT

In FIG. 1 a screw 10 has a helical groove 11 on the periphery thereof. A nut 12 has a helical internal groove 13 complementary to the screw groove 11. A train of balls 14 is confined within the passageway formed by the helical grooves 11 and 13 for threadedly engaging the screw 10 with the nut 12 therethrough. On the nut 12, two bores (not shown) are radially drilled at a predetermined interval, tangentially with the helical internal groove 13 and are interconnected through a return tube 15. A recirculating passage for balls 14 is formed by the return tube 15 together with the helical grooves 11 and 13 wherein the balls 14 are transferred therethrough by the relative movement between the screw 10 and nut 12.

Sectional profiles, perpendicular to the lead of helical grooves 11 and 13, are by-symmetrically formed by a multiplex arc as shown in FIGS. 2 and 3. Engaging surfaces or profiles 20 and 21 of the helical groove 11 are formed by concave short arcs 22 with radius R1, which contact with ball 14 in the direction of about 45° relative to the perpendicular drawn from the center of ball 14 (FIG. 2) to the axis of screw 10, and are formed by arcs 25 and 26 with radii R2 and R3, respectively, which intersect the concave short arcs 22 and suddenly recede from the center of ball 14 (FIG. 2) beyond tangential lines 23 and 24 drawn at both ends of arcs 22. Engaging surfaces or profiles 30 and 31 of the helical internal groove of nut 12 are formed by concave short arcs 32 with radius R4 which contact with the balls 14 in the direction of about 45° relative to the perpendicular drawn from the center of ball 14 (FIG. 2) to the axis of screw 10, and are formed by arcs 35 and 36 with radii R5 and R6, respectively, which intersect the concave short arcs 32 and suddenly recede from the center of ball 14 over tangential lines 33 and 34 drawn at both ends of arcs 32. In the ball screw 10, the arcs 22, now defined as a first profile portion, and the arcs 25 and 26, now defined as a second profile portion, form intersections 27 and 28 as shown in FIG. 4, while in the nut 12, the arcs 32, now defined as the first profile portion, and the arcs 35 and 36, now defined as a second profile portion, form intersections 37 and 38, as shown in FIG. 3. When the axial force F operates upon the nut 12, as shown in FIG. 2, the engaging surfaces 20 and 30 contact with the ball 14 (FIG. 2), while the engaging surfaces 21 and 31 impart to the ball 14 only a slight backlash, in which region the ball 14 thereof is capable of fluctuating in the rolling locus therefor.

The rolling motion of ball 14 in the aforementioned embodiment will be described hereunder in reference to FIG. 4. A bearing ball 14a, which is rolling on its predetermined rolling locus in direction A, contacts with the surface of the helical groove indicated by the arc 22 of the first profile portion of an oval region, shown by a dotted line C, according to Hertz's formula. A friction force B caused by the oval contact operates in the direction opposite to the rolling direction A of the bearing ball 14a on the common operating line since the elastic deformation region of the bearing ball 14a is symmetrical relative to the center 0 of bearing ball 14a.

A righting moment operates upon such a ball 14b as, for example, ball 14a runs off (deviates) to the left from its predetermined rolling locus for the reason hereinafter described, that is, the ball 14b rolls in direction A1 relative to the screw 10 and then no elastic deformation region is effectuated in the left side over the intersection 28, since the arc 26 of the second profile portion is formed so as to suddenly recede from the center of ball 14b over the tangential lines drawn at both ends of arc 22 of the first profile portion. Accordingly, the ball 14b contacts with the surface of the helical groove shown by the arc 22, on the oval region, which in part omits a left portion, indicated by a dotted line C1. Therefore, a friction force B1 is caused in the direction reverse to the rolling direction A1 and in the right side over the center of bearing ball 14b. The biased friction force B1 eccentrically operates upon the bearing ball 14b, which has a tendency to roll in the direction A1 relative to the screw 10, as a clockwise moment in FIG. 4.

Since the clockwise moment biases right the rolling direction A1 of the ball 14b by operating as a righting force, the run off ball 14b is righted to its predetermined rolling locus. In other words, since the righting force operates upon the ball 14b when the bearing ball 14b starts to run off from its predetermined rolling locus, the bearing ball 14b does not run off from its predetermined rolling locus. To the contrary, the conventional ball nut screw devices provide nothing for producing the aforementioned elastic deformation-unbalance in the region relative to the center of the bearing ball. Therefore, the conventional ball nut screw devices are not capable of causing the ball to be righted to its predetermined rolling locus, such that a friction force positively renders the righting moment to the bearing ball.

In the aforementioned embodiment, similarly, the same righting force occurs between the upper portion of the bearing ball 14b and the nut 12 for righting the ball 14b to its predetermined rolling locus together with the aforementioned righting force.

FIG. 5 shows a second embodiment in place of the first embodiment shown in FIG. 3. Left and right engaging surfaces or profiles of a ball screw 10a are formed by a pair of bi-symmetrical single arcs with radius R1 a little larger than the radius R of the bearing ball. Left and right engaging surfaces or profiles of a nut 12a are formed by short concave arcs 32a with radius R4, which contact with bearing balls in the directions of about 45° relative to the perpendicular drawn from the center of the ball to the axis of screw 10a, and are formed by arcs 35a and 36a with R5 and R6 respectively, which suddenly recede from the center of the ball over the tangential lines drawn at both ends of arcs 32a.

Accordingly, the rolling balls are maintained on a predetermined rolling locus therefore, by the friction force caused between the nut 12a and ball.

A third embodiment in place of the first embodiment shown in FIG. 3 is shown in FIG. 6, wherein a right engaging surface or profile of a helical groove on a screw 10b is formed by an arc 22b with the same radius R as the bearing ball and are extended along straight lines 25b and 26b which suddenly recede from the center of the ball over the tangential lines drawn at both ends of the arc 22b, while the left engaging surface or profile of the helical groove is formed by an inclined straight line 28b. In a nut 12b, a left engaging surface or profile of a helical groove is formed by an arc 32b with radius R4 a little larger than the radius R of the ball and formed by lines 35b and 36b which abruptly recede from the center of the ball, while the right engaging surface or profile of the helical groove is formed by an inclined line 38b. The ball screw and nut device according to the third embodiment, which is used on the occasion that the thrust force operates only from the nut 12b to the screw 10b, has the same effect as the aforementioned first embodiment.

In the four engaging profiles perpendicular to the lead of helical grooves, which profiles embrace the bearing ball, as mentioned above, at least one engaging profile is formed by the first profile portion of the concave short arcs contacting with balls and the second profile portion which intersect the both ends of the first profile portion and recede from the center of the ball over tangential lines drawn at the both ends of the first profile portion, so that the contact region caused between the bearing ball and the screw or nut is unbalanced relative to the center of the ball when the rolling ball runs off from the predetermined rolling locus. Since the friction force operates eccentrically upon the bearing ball, the righting force occurs to right the bearing ball to the predetermined rolling locus whereby the bearing ball is prevented to run off from the predetermined rolling locus. Therefore, the ball screw and nut assembly according to the present invention is capable of obtaining its original smooth feed with stability and also has an increased life.

Thus it will be seen that with the structure of the invention the screw and nut are respectively formed with coacting helical grooves in which the train of balls are confined with each groove having a pair of engaging profiles perpendicular to the lead of the groove, so that there are four engaging profiles for each ball. Each engaging profile has an elongated relatively narrow substantially central profile means, formed by the first profile portion referred to above, and this central profile means of each engaging profile is situated between and intersects a pair of lateral profile means, formed by the second profile portion referred to above. These lateral and central profile means of each of the four engaging profiles coact with each ball which engages the central profile means for automatically creating a righting force which maintains each ball along a predetermined rolling locus formed by said central profile means in the event that a ball tends to deviate from said locus.

What is claimed is:

1. In a ball screw and nut assembly, a screw and nut respectively formed with coacting complementary helical grooves which define an elongated helical passageway extending helically around the axis of said screw, a train of balls confined within said passageway, each groove having in a plane perpendicular to the lead of its helical groove a pair of ball-engaging profiles so that said grooves provide four engaging profiles for each ball, at least two of said engaging profiles each having an elongated relatively narrow substantially central ball-engaging profile means and a pair of lateral profile means which do not engage the balls and between which said central profile means is located with said pair of lateral profile means intersecting said central profile means and defining therewith a pair of edges, said central and pair of lateral profile means of each of said two ball-engaging profiles coacting with each ball for automatically creating for each ball a righting force which automatically maintains each ball along a predetermined rolling locus engaging said central profile means when a ball tends to deviate from said locus.

2. The combination of claim 1 and wherein said two ball-engaging profiles each of which is formed with said central and lateral profile means are part of the same groove.

3. The combination of claim 1 and wherein said two ball-engaging profiles each of which is formed with said central and pair of lateral profile means are respectively a pair of opposed ball-engaging profiles of the grooves formed in said nut and screw.

4. The combination of claim 1 and wherein all four of said ball-engaging profiles are each provided with said central and pair of lateral profile means.

5. The combination of claim 1 and wherein each of said central profile means contacts each ball in a direction of about 45° relative to a perpendicular drawn from the center of each ball to the axis of said screw.

6. The combination of claim 1 and wherein each of said central profile means is concave and said pair of lateral profile means of each of said two ball-engaging profiles being spaced from each ball by a distance at least as great as tangents to each ball at the edges where said pair of lateral profile means intersect the central profile means of each of said two ball-engaging profiles.

7. The combination of claim 6 and wherein said pair of lateral profile means of each of said two ball-engaging profiles are straight and extend along said tangents.

8. The combination of claim 6 and wherein said pair of lateral profile means of each of said two ball-engaging profiles are concave and situated beyond said tangents.

* * * * *